US00RE50274E

(19) United States
(12) Reissued Patent
Okada

(10) Patent Number: US RE50,274 E
(45) Date of Reissued Patent: *Jan. 14, 2025

(54) SEMICONDUCTOR MEMORY CARD

(71) Applicant: KIOXIA CORPORATION, Tokyo (JP)

(72) Inventor: Takashi Okada, Yokohama (JP)

(73) Assignee: KIOXIA CORPORATION, Tokyo (JP)

( * ) Notice: This patent is subject to a terminal disclaimer.

(21) Appl. No.: 17/579,820

(22) Filed: Jan. 20, 2022

Related U.S. Patent Documents

Reissue of:
(64) Patent No.: 9,047,547
Issued: Jun. 2, 2015
Appl. No.: 13/353,850
Filed: Jan. 19, 2012

U.S. Applications:
(63) Continuation of application No. 15/612,045, filed on Jun. 2, 2017, now Pat. No. Re. 48,939, which is an
(Continued)

(30) Foreign Application Priority Data

Jul. 23, 2009 (JP) ..... 2009-172106

(51) Int. Cl.
*G06K 19/077* (2006.01)

(52) U.S. Cl.
CPC . *G06K 19/07743* (2013.01); *G06K 19/07732* (2013.01)

(58) Field of Classification Search
CPC ..... G06K 19/07743
See application file for complete search history.

(56) References Cited

U.S. PATENT DOCUMENTS 6,381,143 B1 4/2002 Nakamura
6,945,465 B2 9/2005 Nishizawa et al.
(Continued)

FOREIGN PATENT DOCUMENTS

JP 2005-84935 3/2005
JP 2009-93445 4/2009

OTHER PUBLICATIONS

International Written Opinion mailed Oct. 5, 2010 in PCT/JP2010/062293 filed Jul. 14, 2010.
(Continued)

*Primary Examiner* — Woo H Choi
(74) *Attorney, Agent, or Firm* — Oblon, McClelland, Maier & Neustadt, L.L.P.

(57) ABSTRACT

According to one embodiment, a semiconductor memory card includes a first pin group which includes a plurality of pins arranged in a line at an end portion on a side of an inserting direction into a connector and part of which is used both in a first and second modes; and a second pin group which includes a plurality of pins including at least two pin pairs for differential signal, is arranged so that a ground is positioned on both sides of each of the pin pairs for differential signal, and is used only in the second mode. In the second mode, among the respective pins configuring the first pin group, any of adjacent two pins are changed to a pin pair for differential clock signal, and a function of remaining pins of the first pin group is stopped.

32 Claims, 15 Drawing Sheets

Related U.S. Application Data application for the reissue of Pat. No. 9,047,547, which is a continuation of application No. PCT/JP2010/062293, filed on Jul. 14, 2010.

(56) References Cited

U.S. PATENT DOCUMENTS

| | | | | |
|---|---|---|---|---|
| 7,308,588 | B2 | 12/2007 | Nishizawa | |
| 7,392,343 | B2 | 6/2008 | Oshima | |
| 7,515,470 | B2 * | 4/2009 | Tokiwa | 365/185.09 |
| 7,552,876 | B2 | 6/2009 | Nishizawa et al. | |
| 7,673,080 | B1 | 3/2010 | Yu | |
| 7,809,866 | B2 | 10/2010 | Liu | |
| 7,970,982 | B2 | 6/2011 | Kim | |
| 8,327,051 | B2 | 12/2012 | Kang | |
| 2002/0116668 | A1 | 8/2002 | Chhor | |
| 2003/0161115 | A1 | 8/2003 | Kadonaga | |
| 2003/0221066 | A1 | 11/2003 | Kaneko | |
| 2004/0084538 | A1 | 5/2004 | Nishizawa | |
| 2004/0210715 | A1 | 10/2004 | Harari | |
| 2005/0252978 | A1 | 11/2005 | Nishizawa | |
| 2005/0281010 | A1 | 12/2005 | Wang | |
| 2006/0085583 | A1 | 4/2006 | Yu | |
| 2006/0161716 | A1 | 7/2006 | Lin | |
| 2006/0220201 | A1 | 10/2006 | Liu | |
| 2006/0264110 | A1 * | 11/2006 | Mambakkam et al. | 439/630 |
| 2007/0005829 | A1 | 1/2007 | Fujimoto | |
| 2007/0145154 | A1 | 6/2007 | Yu et al. | |
| 2007/0294440 | A1 | 12/2007 | Haku | |
| 2008/0065830 | A1 | 3/2008 | Aoki | |
| 2008/0073436 | A1 * | 3/2008 | Nishizawa et al. | 235/492 |
| 2008/0082825 | A1 | 4/2008 | Mizushima | |
| 2008/0132091 | A1 * | 6/2008 | Choi | 439/55 |
| 2008/0235939 | A1 | 10/2008 | Hiew | |
| 2009/0004776 | A1 | 1/2009 | Ye | |
| 2009/0004785 | A1 | 1/2009 | Chiu | |
| 2009/0040734 | A1 | 2/2009 | Ochi et al. | |
| 2009/0150610 | A1 | 6/2009 | Hsu | |
| 2009/0193180 | A1 * | 7/2009 | Ito | 711/103 |
| 2009/0254704 | A1 * | 10/2009 | Nakamura et al. | 711/115 |
| 2010/0172112 | A1 | 7/2010 | Okada | |
| 2011/0145465 | A1 * | 6/2011 | Okada | 710/301 |
| 2011/0271040 | A1 * | 11/2011 | Kamizono | 711/103 |

OTHER PUBLICATIONS

"Merriam-Webster's Collegiate® Dictionary (10th ed.)," published by Merriam-Webster Incorporated in 2001. (Year: 2001).

Combined Chinese Office Action and Search Report issued Dec. 30, 2013, in Chinese Patent Application No. 201080032138.X with English translation and English translation of category of cited documents.

International Search Report mailed Oct. 5, 2010 in PCT/JP2010/062293 filed Jul. 14, 2010.

Extended European Search Report issued Nov. 25, 2014, in European Patent Application No. 10802300.3.

* cited by examiner

SEMICONDUCTOR MEMORY CARD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

*Continuation Reissue Application*

*One or more continuation reissue applications have been filed based on U.S. Pat. No. 9,047,547.*

*The present application is a continuation of Reissue application Ser. No. 15/612,045 filed Jun. 2, 2017, which is a Reissue of U.S. Pat. No. 9,047,547.*

This application is based upon and claims the benefit of priority from Japanese Patent Application No. 2009-172106, filed on Jul. 23, 2009 and International Patent Application No. PCT/JP2010/062293, filed on Jul. 14, 2010; the entire contents all of which are incorporated herein by reference.

FIELD

Embodiments described herein relate generally to a semiconductor memory card.

BACKGROUND

In recent years, a memory card in which, for example, a semiconductor memory such as a NAND flash memory is used has been used for purposes of recording consecutively shot still images and a high-resolution motion image. Then, these uses to read or write a lot of information in a short time, i.e., increase data transfer speed.

In a conventional SD™ memory card (hereinafter, described as SD memory card), the data transfer speed is as high as about 20 MB/sec. Then, aside from in a normal operation mode (normal mode), even in an operation mode (high-speed mode) in which information can be read and written at a higher speed than the normal mode, so that high-speed data transfer can be performed while maintaining compatibility with a normal host device.

In the case of enabling switching of the operation mode, if functions of all of pins are changed in each mode, a load on a controller that controls the semiconductor memory increases, which prevents increase in data transfer speed. Therefore, pins for high-speed mode are provided other than pins for normal mode. On the other hand, if pins are newly provided corresponding to all of signals used in the high speed mode similarly to a two-row arrangement such as one employed in the MMC (Multi Media Card) standard, this increases constraints on a wiring layout of a circuit substrate on which the semiconductor memory is mounted (see Japanese Patent Application Laid-open No. 2005-84935)

DETAILED DESCRIPTION

In general, according to one embodiment, a semiconductor memory card includes a semiconductor memory that is mounted on one surface of a substrate and a controller that is mounted on the other surface of the substrate and controls the semiconductor memory, and is capable of operating in a first mode and a second mode in which data is transferred at a higher speed than the first mode. The semiconductor memory card comprising a first pin group which includes a plurality of pins arranged in a line at an end portion on a side of an inserting direction into a connector, which functions as four data pins, one command pin, one power source pin, one clock pin, and two ground pins in the first mode, and part of which is used both in the first and second modes; and a second pin group which includes a plurality of pins including at least two pin pairs for differential signal, is arranged so that a ground is positioned on both sides of each of the pin pairs for differential signal, and is used only in the second mode. In the second mode, among the respective pins configuring the first pin group, any of adjacent two out of ones that function as the data pins, the command pin, and the clock pin in the first mode are changed to a pin pair for differential clock signal to function as the pin pair for differential clock signal, and a function of remaining pins of the first pin group is stopped.

Exemplary embodiments of a semiconductor memory card will be explained below in detail with reference to the accompanying drawings. The present invention is not limited to the following embodiments.

First Embodiment

Figure 1:
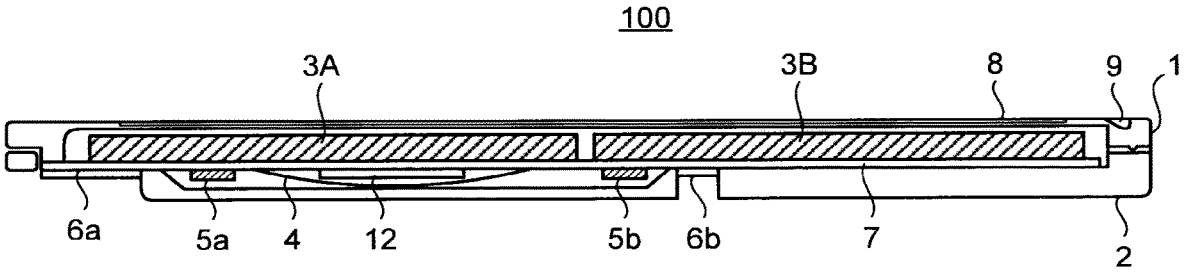
FIG. 1 is a cross-sectional view illustrating a configuration of an SD memory card as a semiconductor memory card according to a first embodiment.

FIG. 1 is a cross-sectional view illustrating a configuration of an SD memory card as a semiconductor memory card according to a first embodiment. A left direction on a sheet of FIG. 1 is an inserting direction into a connector, and a left side is defined as "front". In the similar manner, a right direction on the sheet of FIG. 1 is a removing direction from the connector, and a right side is defined as "back". Moreover, an upper direction on the sheet of FIG. 1 is defined as "up", and a lower direction on the sheet of FIG. 1 is defined as "down".

As shown in FIG. 1, an exterior of an SD memory card 100 is formed of an upper case 1 and a lower case 2 whose periphery is adhered to the upper case 1 and which accommodates memory packages and a memory controller that controls the memory packages.

In the SD memory card 100 formed of the upper case 1 and the lower case 2, for example, memory packages 3A and 3B formed of a nonvolatile semiconductor memory such as a NAND-type flash memory and a memory controller 12 that controls them are mounted on a circuit substrate 7. The memory packages 3A and 3B are mounted on the upper surface (upper case 1 side) of the circuit substrate 7 and the memory controller 12 that controls the memory packages 3A and 3B is mounted on the back side (lower case 2 side) of the circuit substrate 7 and just under the memory package 3A. A resin potting 4 is formed around the memory controller 12 to protect the memory controller 12. In a front-lower portion of the SD memory card 100, a terminal portion 6a is formed, which is electrically connected to a not-shown external device and is for inputting and outputting data in the memory packages 3A and 3B in a normal mode. Moreover, in a lower portion that is on a back end side with respect to the center in a front-and-back direction, a terminal portion 6b for inputting and outputting data in the memory packages 3A and 3B in a high-speed mode is formed. A central portion of the SD memory card 100 in the front-and-back direction is a portion that easily receives a bending stress, a torsional stress, and the like when attaching or removing to or from a host device and is structurally weak due to the absence of the memory packages 3A and 3B; however, degradation of stiffness of the SD memory card 100 due to provision of the terminal portion 6b can be reduced by forming the terminal portion 6b on the back end side while avoiding this portion.

Data in the memory packages 3A and 3B is exchanged with a not-shown external device (host device) via the memory controller 12 and the terminal portions 6a and 6b. A plurality of resistive elements (hereinafter, described as resistive elements (groups) 5a and 5b) is formed between the memory controller 12 and the terminal portions 6a and 6b on the back side of the circuit substrate 7. The resistance value of the resistive elements 5a and 5b takes a value of, for example, a few [Ω] to tens of [Ω]. The resistive element group 5b is also arranged on the back end side to avoid the central portion of the SD memory card 100 in the front-and-back direction that is structurally weak because of the absence of the memory packages 3A and 3B.

The upper case 1 includes a label applying groove 8 for applying a label on which a specification of the SD memory card 100 or the like is printed and a hold 9 that is gripped when attaching and removing to and from a not-shown external device.

Figure 2A:
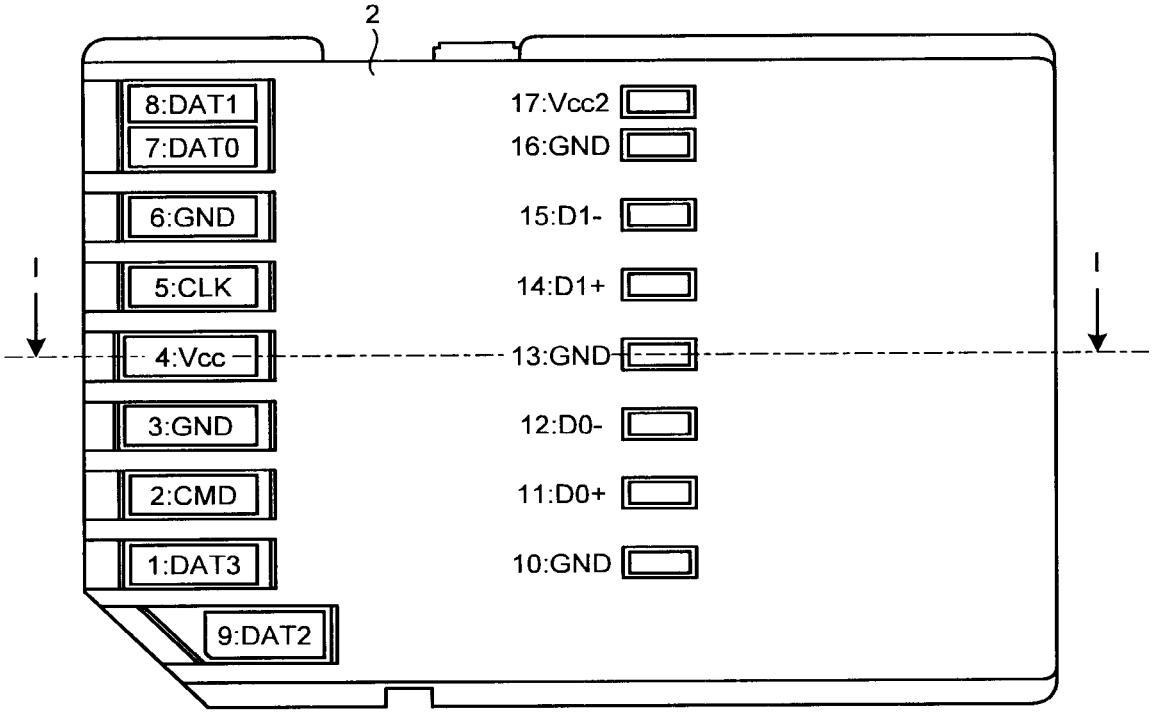
FIG. 2A and FIG. 2B are diagrams illustrating an appearance of the SD memory card viewed from a lower case side.

FIG. 2A illustrates an appearance of the SD memory card 100 viewed from the lower case 2 side. The cross-sectional structure shown in FIG. 1 is an I-I cross section in this figure. The SD memory card 100 includes 1st to 9th pins for normal mode and 10th to 17th pins for high-speed mode.

Positions, shapes, and functions of the 1st to 9th pins are similar to pins included in a normal SD memory card. In other words, the 1st pin is assigned DAT3 (data), the 2nd pin is assigned CMD (command), the 3rd pin is assigned GND (ground), the 4th pin is assigned Vcc (power source), the 5th pin is assigned CLK (clock), the 6th pin is assigned GND (ground), the 7th pin is assigned DAT0 (data), the 8th pin is assigned DAT1 (data), and the 9th pin is assigned DAT2 (data).

The 10th to 17th pins are pins used only in the high-speed mode, and the 10th pin is assigned GND (ground), the 11th pin is assigned D0+ (differential data +), the 12th pin is assigned D0− (differential data −), the 13th pin is assigned GND (ground), the 14th pin is assigned D1+ (differential data +), the 15th pin is assigned D1− (differential data −), the 16th pin is assigned GND (ground), and the 17th pin is assigned Vcc2 (power source). In other words, two pairs (pair of the 11th pin and the 12th pin and pair of the 14th pin and the 15th pin) of adjacent pins for differential signal are included, and each pair of the pins is arranged to be sandwiched by GNDs. The pairs of the pins for differential signal each have a data transfer function for one channel, so that the SD memory card 100 has the data transfer function totally for two channels for high-speed mode. The 17th pin assigned Vcc2 can be omitted, and in this case, seven pins of the 10th to the 16th are arranged as the pins for high-speed mode. The 17th pin assigned Vcc2 can be arranged between an arbitrary pin for differential signal and GND.

The 10th to 17th pins are formed to be smaller than the 1st to 9th pins, so that a load capacity is reduced to make it easy to realize a high-speed operation. The 10th to 17th pins are used only in the high-speed mode, so that even if they are made small compared with the 1st to 9th pins, compatibility with a conventional host device (host device compatible with only the normal SD card) is not lost. Moreover, if a desired data transfer speed can be realized, the pins (10th to 17th pins) for high-speed mode can be formed to have the same size as the pins (1st to 9th pins) for normal mode.

Figure 2B:
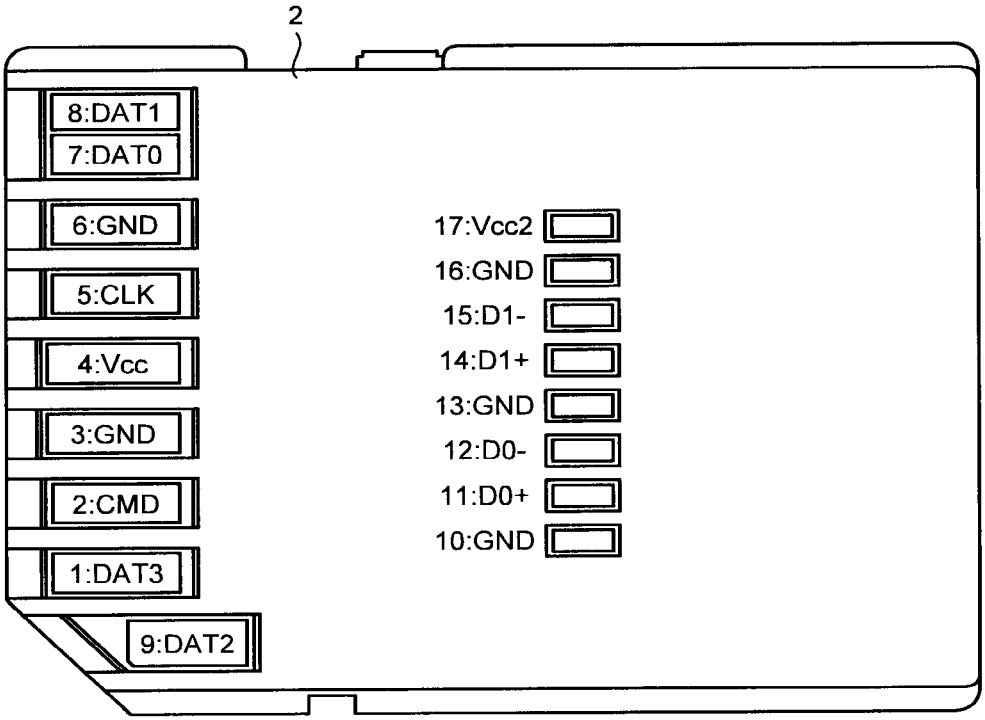

In FIG. 2A, the configuration is illustrated as an example, in which the intervals between the centers of the 10th to 17th pins in a width direction (orthogonal to front-and-back direction) are the same as the intervals between the centers of the 1st to 8th pins in the width direction; however, as shown in FIG. 2B, the intervals between the centers of the 10th to 17th pins in the width direction can be different from the intervals between the centers of the 1st to 8th pins.

Figure 3:
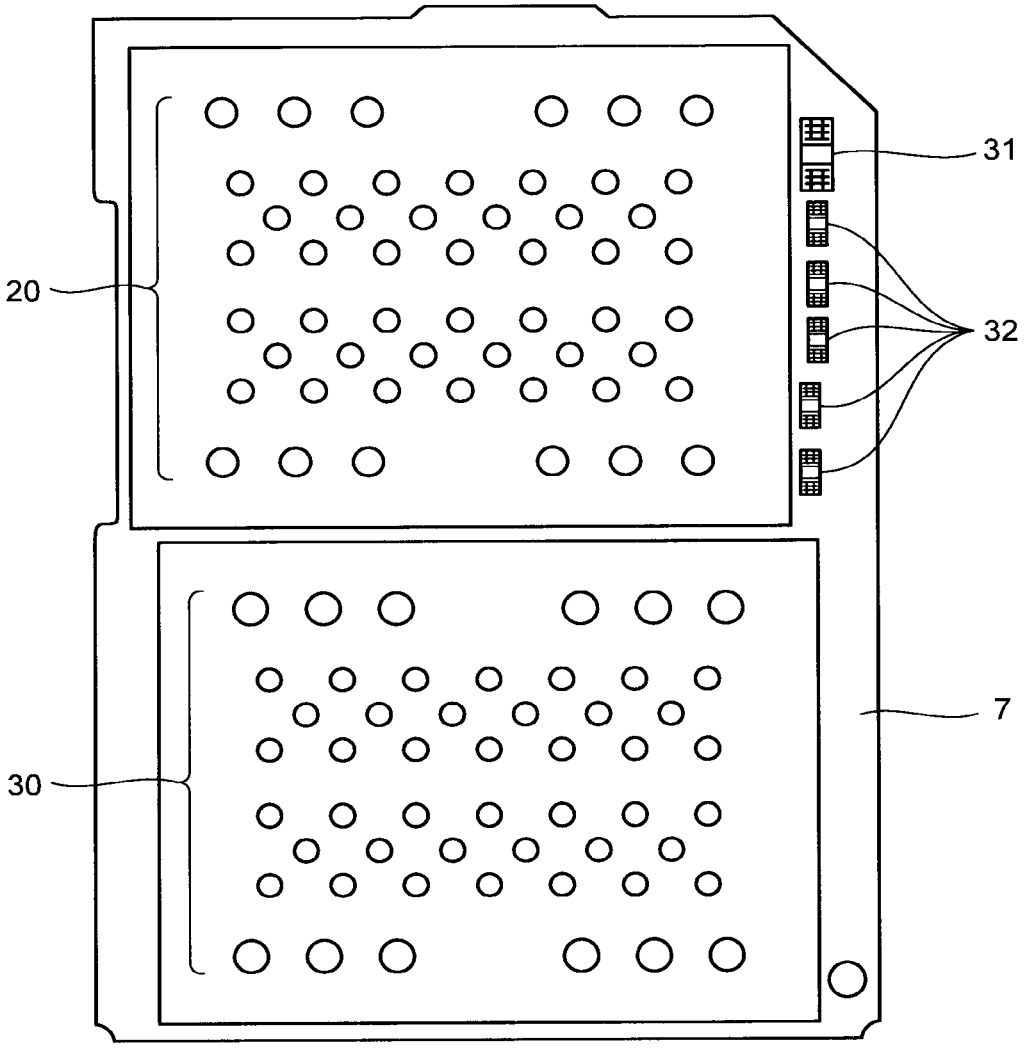
FIG. 3 is a diagram illustrating a configuration example of solder resist opening patterns on a memory package mounting surface of a circuit substrate.

FIG. 3 is a diagram illustrating a configuration example of solder resist opening patterns on the mounting surface of the circuit substrate 7 for the memory packages 3A and 3B. The memory package mounting surface of the circuit substrate 7 is a surface on a side facing the upper case. As shown in FIG. 3, on the mounting surface of the circuit substrate 7 for the memory packages 3A and 3B, solder resist opening patterns 20 and 30 are formed to be aligned with each position of solder connection terminals of the memory packages 3A and 3B. In other words, on the solder resist opening patterns 20 and 30, a mounting pad is provided for solder-connecting the memory packages 3A and 3B with the circuit substrate 7 to electrically connecting them.

Moreover, on the circuit substrate 7, a mounting pad is provided for eclectically connecting a fuse element 31 and capacitor elements 32 by a solder connection.

Figure 4:
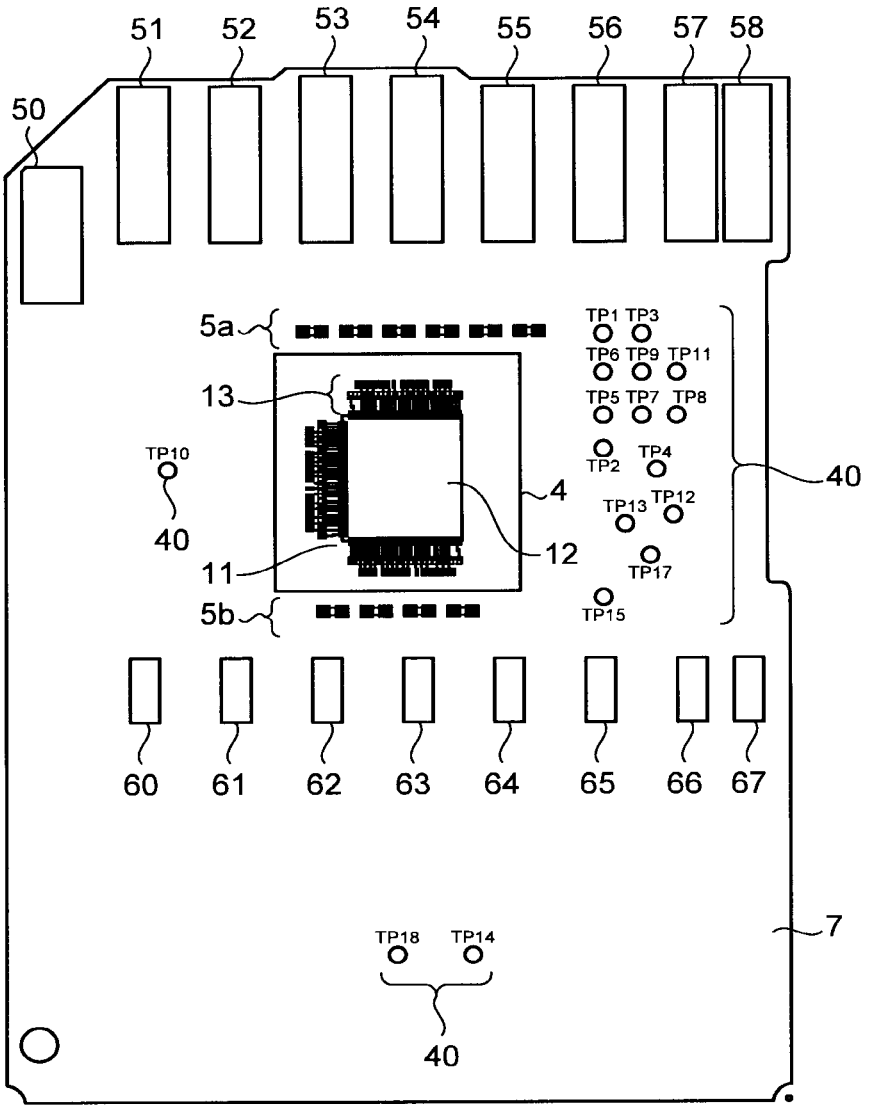
FIG. 4 is a plan view of a back side of the circuit substrate.

FIG. 4 illustrates a plan view of the circuit substrate 7 viewed from the back side of the circuit substrate 7, i.e., the lower case 2 side. As shown in FIG. 4, on the back side of the circuit substrate 7, the memory controller 12, a plurality of test pad groups 40, the resistive element groups 5a and 5b, and terminal patterns 50 to 58 and 60 to 67 formed of gold or the like are formed. As described above, bonding wires 11 are formed for the number of data to be exchanged from a plurality of electrode pads formed on the surface of the memory controller 12 toward bonding fingers 13. Moreover, as described above, the resin potting 4 is formed to protect the memory controller 12, the bonding fingers 13, and the bonding wires 11.

Moreover, as shown in FIG. 4, the terminal patterns 50 to 58 are each formed to correspond to the pin arrangement of the terminal portion 6a explained in FIG. 1. The terminal pattern 50 corresponds to a DAT (data) 2 pin (9th pin), the terminal pattern 51 corresponds to a DAT3 pin (1st pin), the terminal pattern 52 corresponds to a CMD (command) pin (2nd pin), the terminal pattern 53 corresponds to a GND pin (3rd pin), the terminal pattern 54 corresponds to a Vcc pin (4th pin), the terminal pattern 55 corresponds to a CLK (clock) pin (5th pin), the terminal pattern 56 corresponds to a GND pin (6th pin), the terminal pattern 57 corresponds to a DAT0 pin (7th pin), and the terminal pattern 58 corresponds to a DAT1 pin (8th pin). When not specifically distinguished, these are described as a terminal pattern A.

Furthermore, as shown in FIG. 4, the terminal patterns 60 to 67 are each formed to correspond to the pin arrangement of the terminal portion 6b explained in FIG. 1. The terminal pattern 60 corresponds to a GND pin (10th pin), the terminal pattern 61 corresponds to a D0+ pin (11th pin), the terminal pattern 62 corresponds to a D0– pin (12th pin), the terminal pattern 63 corresponds to a GND pin (13th pin), the terminal pattern 64 corresponds to a D1+ pin (14th pin), the terminal pattern 65 corresponds to a D1– pin (15th pin), the terminal pattern 66 corresponds to a GND pin (16th pin), and the terminal pattern 67 corresponds to a Vcc pin (17th pin). When not specifically distinguished, these are described as a terminal pattern B.

Moreover, the resistive element group 5a is formed of six resistive elements. This is because data input and output between a not-shown external device and the memory packages 3A and 3B is performed by data input and output by using totally six terminal patterns of the terminal patterns 50 to 52, 55, 57 and 58. In other words, the terminal patterns 50 to 52, 55, 57 and 58 and the resistive element group 5a are electrically hard-wired, respectively, and any of a plurality of the bonding fingers 13 arranged on the memory controller 12 side and the resistive element group 5a are electrically connected by wires having approximately the same wire length.

Furthermore, the resistive element group 5b is formed of four resistive elements. This is because data input and output between a not-shown external device and the memory packages 3A and 3B is performed by data input and output by using totally four terminal patterns of the terminal patterns 61, 62, 64, and 65. In other words, the terminal patterns 61, 62, 64, and 65 and the resistive element group 5b are electrically connected by wirings, respectively, and any of a plurality of the bonding fingers 13 arranged on the memory controller 12 side and the resistive element group 5b are electrically connected by wires having approximately the same wire length.

The resistive element groups 5a and 5b can be omitted.

Figure 5:
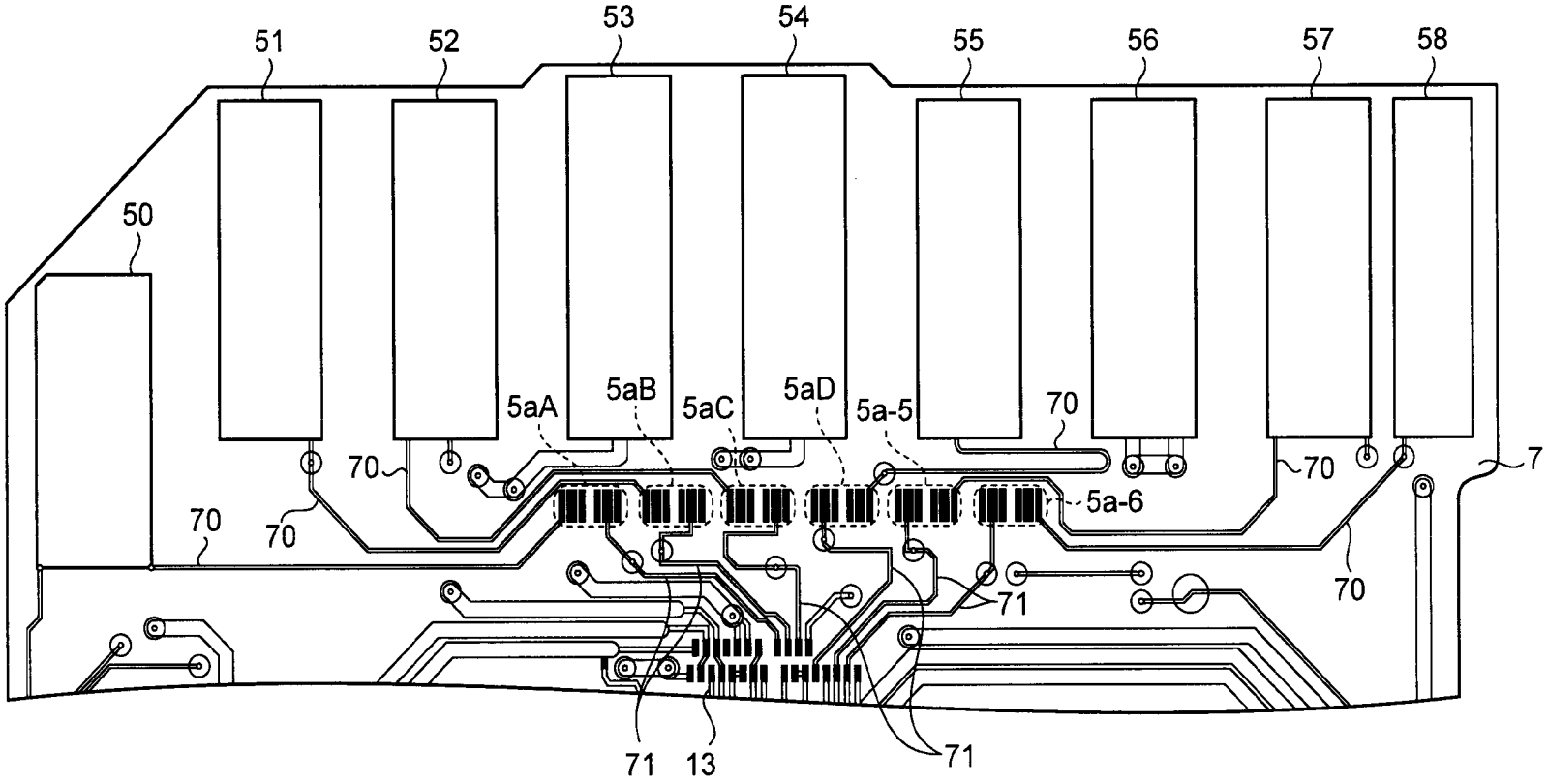
FIG. 5 is a diagram illustrating a state where a terminal pattern for normal mode, a resistive element group, and bonding fingers formed on the circuit substrate are each electrically hard-wired.

FIG. 5 illustrates a state where the terminal pattern A for normal mode, the resistive element group 5a, and the bonding fingers 13 formed on the circuit substrate 7 are each electrically connected by the wirings. Six resistive elements included in the resistive element group 5a are described as resistive elements 5a-1 to 5a-6, respectively.

As shown in FIG. 5, the terminal pattern 50 is connected to the resistive element 5a-1, the terminal pattern 51 is connected to the resistive element 5a-2, the terminal pattern 52 is connected to the resistive element 5a-3, the terminal pattern 55 is connected to the resistive element 5a-4, the terminal pattern 57 is connected to the resistive element 5a-5, and the terminal pattern 58 is connected to the resistive element 5a-6, by wires 70. The resistive elements 5a-1 to 5a-6 and the bonding fingers are connected by wires 71, respectively. Whereby, various data transferred from the terminal pattern A is transferred to the memory controller 12.

Then, data input and output with the memory controller 12 is performed by the terminal patterns 50 to 52, 55, 57, and 58 out of the terminal patterns 50 to 58. Specifically, data is transferred to, for example, a NAND flash memory that forms the memory packages 3A and 3B by the terminal patterns 50, 51, 57, and 58.

Moreover, a command transmission and reception is performed by the terminal pattern 52. An operation sequence at the time of a write operation, a read operation, and an erase operation of the data to be transferred is performed based on this command. For performing this sequence, an operation of each circuit block included in the memory packages 3A and 3B is controlled. Furthermore, a clock CLK is transferred from the terminal pattern 55 to the memory controller 12. Moreover, the above operation sequence is performed based on the clock CLK.

Furthermore, voltage is supplied to the whole SD memory card by the terminal pattern 54.

The resistive element group 5a has a shape in which, for example, a metal terminal is provided on both sides of a resistive material formed of ceramic. In other words, one ends of the resistive elements 5a-1 to 5a-6 and the terminal pattern A are connected by the wires 70, and the other ends of the resistive elements 5a-1 to 5a-6 and the bonding fingers 13 are connected by the wires 71.

In other words, there are provided six wires 71 that connect the resistive elements 5a-1 to 5a-6 and the bonding fingers 13. The wires 71 have approximately equal wire length.

Moreover, in each of signal paths reaching the bonding fingers 13 from the terminal patterns 50 to 52, 55, 57, and 58 via the resistive elements 5a, the signal paths reaching the bonding fingers 13 from the terminal patterns 50 to 52, 55, 57, and 58 via the resistive elements 5a are all approximately equal.

More specifically, the sum of the length of the wire 70 that connects the terminal pattern 50 and the resistive element 5a-1 and the length of the wire 71 that connects the resistive element 5a-1 and the bonding finger 13, the sum of the length of the wire 70 that connects the terminal pattern 51 and the resistive element 5a-2 and the length of the wire 71 that connects the resistive element 5a-2 and the bonding finger 13, the sum of the length of the wire 70 that connects the terminal pattern 52 and the resistive element 5a-3 and the length of the wire 71 that connects the resistive element 5a-3 and the bonding finger 13, the sum of the length of the wire 70 that connects the terminal pattern 55 and the resistive element 5a-4 and the length of the wire 71 that connects the resistive element 5a-4 and the bonding finger 13, the sum of the length of the wire 70 that connects the terminal pattern 57 and the resistive element 5a-5 and the length of the wire 71 that connects the resistive element 5a-5 and the bonding finger 13, and the sum of the length of the wire 70 that connects the terminal pattern 58 and the resistive element 5a-6 and the length of the wire 71 that connects the resistive element 5a-6 and the bonding finger 13, are approximately equal to each other.

This is because an ID terminal for normal mode of the memory controller 12 is arranged near the terminal pattern A and each of the wires 70 and 71 is formed on the same surface, i.e., on the circuit substrate 7. In FIG. 5, the configuration is illustrated as an example, in which the signal paths reaching the bonding fingers 13 from the terminal patterns 50 to 52, 55, 57, and 58 via the resistive elements 5a are all wired approximately equally; however, if there is not problem in characteristics even if the wire length of each signal path is different, it is possible to design so that the wire lengths are made different.

On the other hand, an IO terminal of the memory controller 12 for high-speed mode is arranged on the back end side of the SD memory card 100. Whereby, the length of the wires for high-speed mode also becomes approximately equal.

Figure 6:
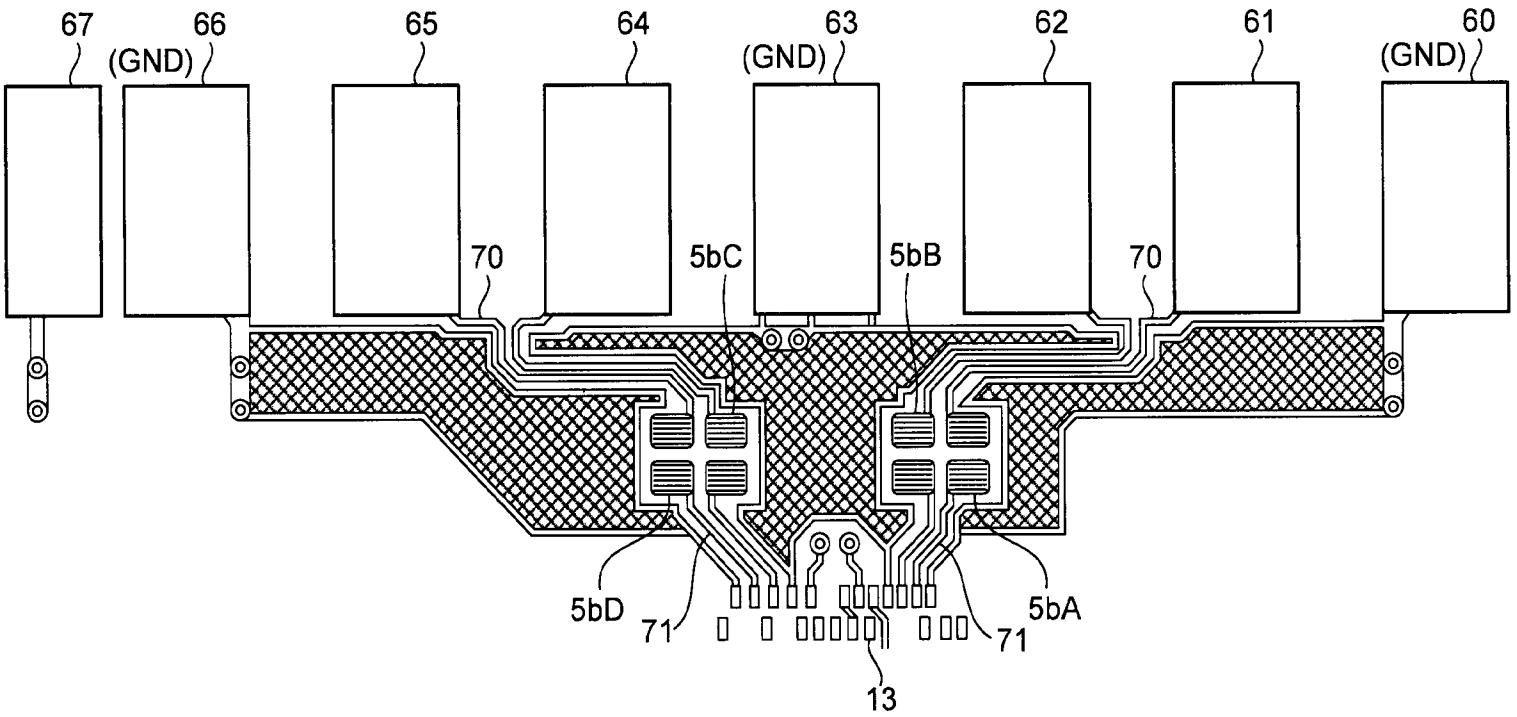
FIG. 6 is a diagram illustrating a state where a terminal pattern for high-speed mode, a resistive element group, and bonding fingers formed on the circuit substrate are each electrically hard-wired.

FIG. 6 illustrates a state where the terminal pattern B for high-speed mode, the resistive element group 5b, and the bonding fingers 13 formed on the circuit substrate 7 are each electrically connected by wires. Four resistive elements included in the resistive element group 5b are described as resistive elements 5b-1 to 5b-4, respectively.

As shown in FIG. 6, the terminal pattern 61 is connected to the resistive element 5b-1, the terminal pattern 62 is connected to the resistive element 5b-2, the terminal pattern 64 is connected to the resistive element 5b-3, and the terminal pattern 65 is connected to the resistive element 5b-4, by the wires 70. The resistive elements 5b-1 to 5b-4 and the bonding fingers are connected by the wires 71, respectively. Whereby, various data transferred from the terminal pattern B is transferred to the memory controller 12.

The resistive element group 5b has a shape in which, for example, a metal terminal is provided on both sides of a resistive material formed of ceramic. In other words, one ends of the resistive elements 5b-1 to 5b-4 and the terminal pattern B are connected by the wires 70, and the other ends of the resistive elements 5b-1 to 5b-4 and the bonding fingers 13 are connected by the wires 71.

In other words, there are provided four wires 71 that connect the resistive elements 5b-1 to 5b-4 and the bonding fingers 13. The wires 71 have approximately equal wire length.

Moreover, in each of signal paths reaching the bonding fingers 13 from the terminal patterns 61, 62, 64, and 65 via the resistive elements 5b, the signal paths reaching the bonding fingers 13 from the terminal patterns 61, 62, 64, and 65 via the resistive elements 5b are all approximately equal. In FIG. 6, the configuration is illustrated as an example, in which the signal paths reaching the bonding fingers 13 from the terminal patterns 61, 62, 64, and 65 via the resistive elements 5b are all wired approximately equally; however, if there is no problem in characteristics even if the wire length of each signal path is different, it is possible to design so that the wire lengths are made different.

More specifically, the sum of the length of the wire 70 that connects the terminal pattern 61 and the resistive element 5b-1 and the length of the wire 71 that connects the resistive element 5b-1 and the bonding finger 13, the sum of the length of the wire 70 that connects the terminal pattern 62 and the resistive element 5b-2 and the length of the wire 71 that connects the resistive element 5b-2 and the bonding finger 13, the sum of the length of the wire 70 that connects the terminal pattern 64 and the resistive element 5b-3 and the length of the wire 71 that connects the resistive element 5b-3 and the bonding finger 13, and the sum of the length of the wire 70 that connects the terminal pattern 65 and the resistive element 5b-4 and the length of the wire 71 that connects the resistive element 5b-4 and the bonding finger 13, are approximately equal to each other.

Moreover, the wire 71 connected to the D0+ pin and the wire 71 connected to the D0− pin are wired in parallel to effectively transmit the differential signal. In the similar manner, the wire 70 connected to the D0+ pin and the wire 70 connected to the D0− pin are wired in parallel. The wires 71 and 70 connected to the D0+ pin and the wires 71 and 70 connected to the D0− pin are wired in the similar manner. Furthermore, the wires for GND are provided adjacently on both sides of the paired wires for the D0+ pin and the D0− pin, which are connected to the terminal patterns 63 and 66 as the GND terminals. In the similar manner, the wires for GND are provided adjacently on both sides of the paired wires for the D1+ pin and the D1− pin, which are connected to the terminal patterns 63 and 60 as the GND terminals. For wiring such pairs of the differential wires, if there is not problem in characteristics even if the wire lengths of the wire 70 and the wire 71 are different, it is designed in some cases so that the wire lengths are made different.

This is because the IO terminal for high-speed mode of the memory controller 12 is arranged near the terminal pattern B and each of the wires 70 and 71 is formed on the same surface, i.e., on the circuit substrate 7.

Then, data input and output in the high-speed mode with the memory controller 12 is performed by the terminal patterns 61, 62, 64, and 65 out of the terminal patterns 60 to 67. Specifically, data is transferred to, for example, a NAND flash memory that forms the memory packages 3A and 3B by the terminal patterns 61, 62, 64, and 65.

When the SD memory card is operated in the high-speed mode, the function in the normal mode is invalidated for the pins other than GND (3rd and 6th) and Vcc (4th) out of the 1st to 9th pins. Then, for the 7th and 8th pins, the function different from in the normal mode is assigned to be used as differential clocks CLK+ and CLK− for high-speed operation. Therefore, for the 1st, 2nd, 5th, and 9th pins, the function is stopped at the time of the high-speed mode, so that they are not used. The frequency of the differential clocks CLK+ and CLK− is 150 MHz at a maximum, so that the use of the 7th and 8th pins that are for normal mode does not prevent high-speed data transfer. CLK+ and CLK− are transferred by using existing pins for normal mode, so that it is eliminated to newly provide these terminals for transfer on the circuit substrate 7, thereby reducing constraints on a wiring layout.

Then, 1.5 Gbps data is transferred per channel based on CLK± with the channel by the differential data pins D0± and the channel by the differential data pins D1±, and totally, the data transfer speed of 300 Mbytes/sec is realized.

In the case of increasing the number of contact points of the connector on the host device side to be compatible with the SD memory card 100, if the 1st to 9th pins and the 10th to 17th pins are offset to be arranged in a staggered manner similarly to the two-row arrangement of the MMC standard, the terminals for high-speed mode on the connector side pass between the pins for normal mode on the card side when removing and inserting the SD memory card 100. In this case, the terminal on the connector side may come into contact with a pin different from the target pin to cause malfunction. Moreover, in the case when the normal SD memory card is inserted into the host device in which the number of the contact points of the connector is increased, the terminals for high-speed mode on the connector side come into contact with the lower case, and if the normal SD memory card is removed and inserted in this state, the lower case may be grinded.

Therefore, at least the terminals for high-speed mode of the terminals of the connector on the host device side are preferably brought into contact with the normal SD memory card or the SD memory card 100 after the card is inserted. In other words, it is applicable that the terminals for high-speed mode of the connector on the host device side are retracted to a position at which the terminals are not in contact with the card in an ordinary state. And only when it is detected that the normal SD memory card or the SD memory card 100 is inserted into the connector, the terminals are moved to a position at which the terminals can come into contact with the SD memory card. In this case, if the inserted card is the normal SD memory card, the terminals for high-speed mode of the connector come into contact with the lower case. However, the terminals for high-speed mode of the connector do not slide on the lower case, so that the lower case is not easily damaged. Moreover, when the card is inserted or removed, the terminals for high-speed mode on the connector side do not pass between the pins for normal mode on the card side, so that malfunction does not easily occur.

It is possible to detect that the normal SD memory card or the SD memory card 100 is inserted into the connector by each method such as a mechanical, electrical, magnetical, or optical method; however, the use of any method can be realized within the range of a publicly-known technology, so that explanation of a detailed configuration is omitted.

Moreover, it is applicable that the SD memory card 100 can be distinguished from the normal SD memory card on the connector side, and only when the SD memory card 100 compatible with the high-speed mode is inserted, the terminals for high-speed mode are brought into contact with the SD memory card 100. Accordingly, it is eliminated that the terminals for high-speed mode of the connector come into contact with the normal SD memory card, so that the lower case is prevented from being damaged due to the contact with the terminals for high-speed mode.

Figure 7:
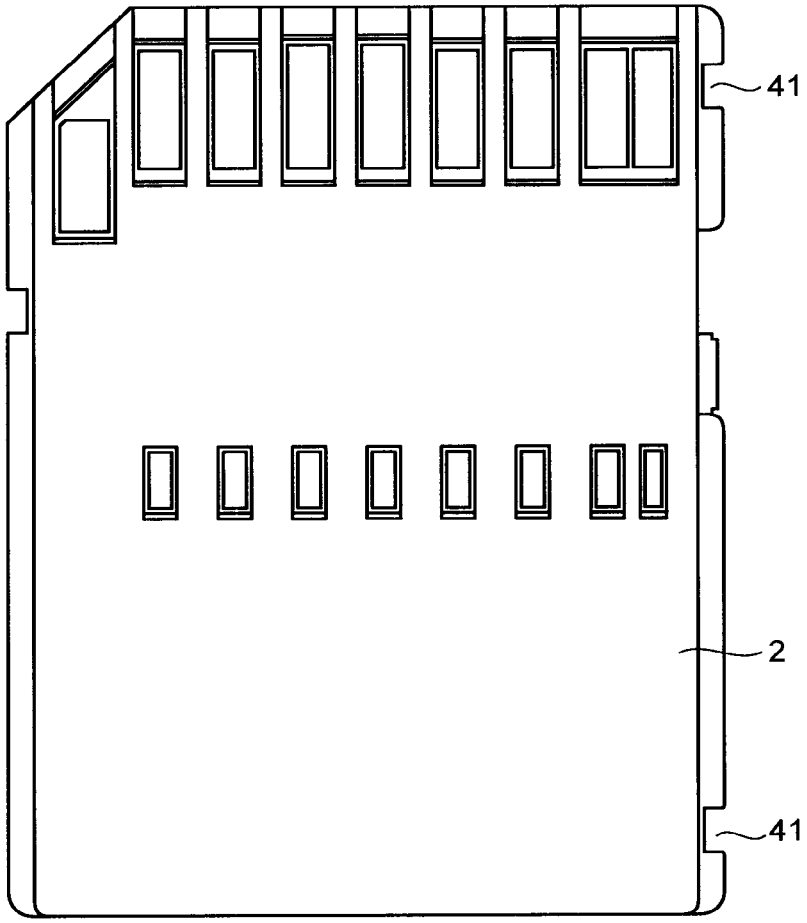
FIG. 7 is a diagram illustrating an example of the SD memory card in which a notch for detection is provided.

The SD memory card 100 can be distinguished from the normal SD memory card on the connector side simply by making at least part of the outer shape of the side surface of the SD memory card 100 different from the normal SD memory card. For example, as shown in FIG. 7, a notch 41 for recognizing the type of the card can be provided in the side surface of the SD memory card 100. If there is at least one notch 41, the SD memory card 100 can be distinguished from the normal SD memory card, and recognition accuracy can be improved by proving a plurality of the notches 41.

Figure 8A:
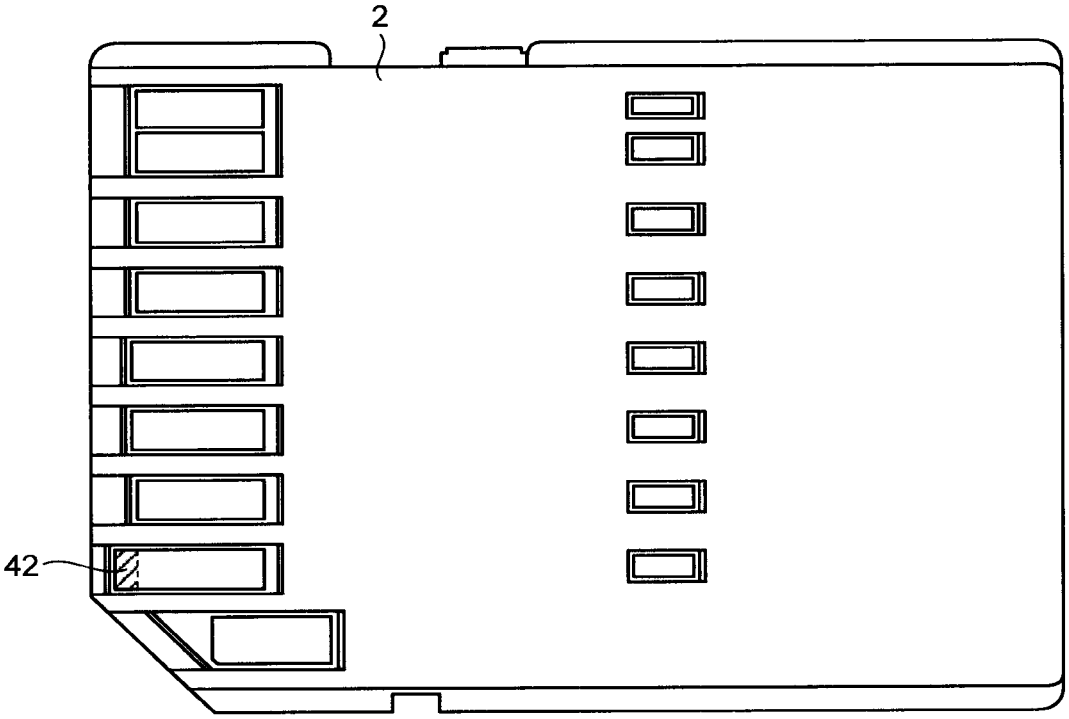
FIG. 8A and FIG. 8B are diagrams illustrating an example of the SD memory card that includes a pin expanded for detection.
Figure 8B:
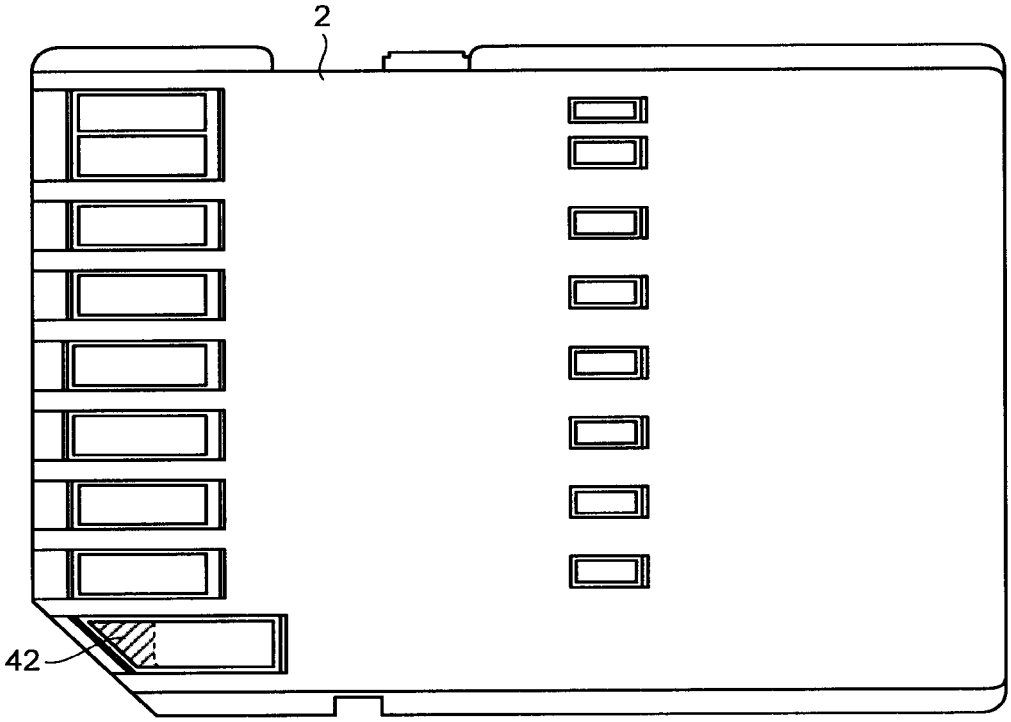

Moreover, as another configuration for making it possible to distinguish the SD memory card 100 from the normal SD memory card on the connector side, as shown in FIGS. 8A and 8B, it is possible to expand part of the pin for normal mode compared with the normal SD memory card to provide an expanded portion 42. With such a configuration, it is possible to distinguish whether or not the normal SD memory card based on electrical conduction or non-conduction between a region (normal region) same as the normal SD memory card and a region (expanding region) to be expanded. In other words, in the case of the normal SD memory card, a predetermined pin for normal mode is not expanded, so that there is not current conduction between the normal region and the expanding region. On the other hand, in the case of the SD memory card 100 compatible with the high-speed mode, the predetermined pin for normal mode is expanded, so that the normal region and the expanding region are electrically conducted.

Figure 9:
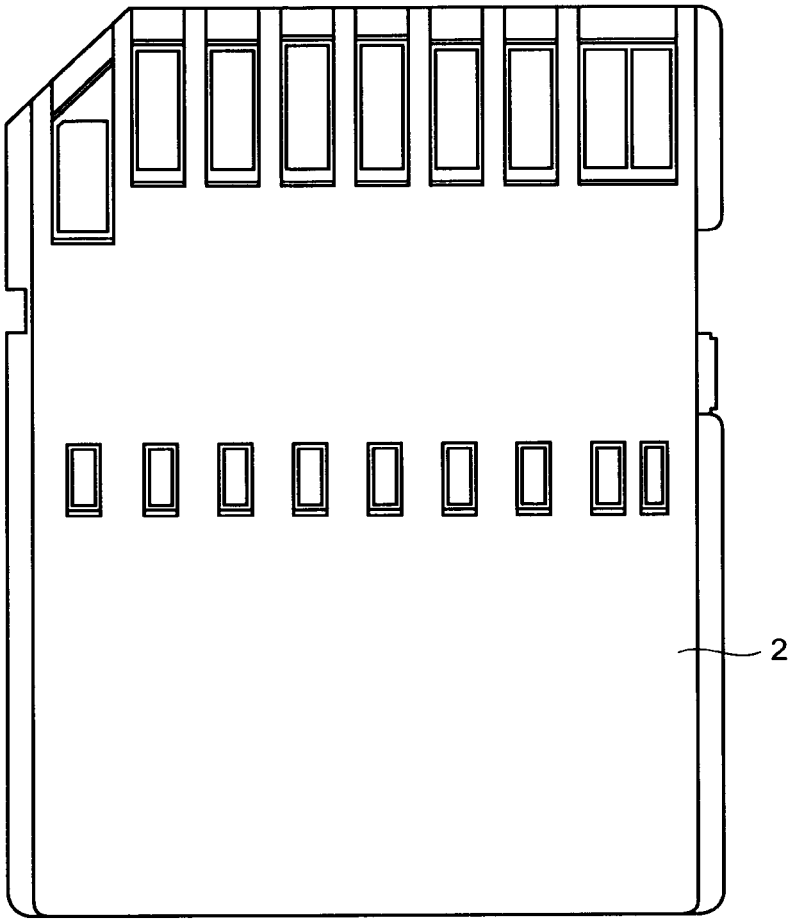
FIG. 9 is a diagram illustrating an example of the SD memory card to which one pin is further added for high-speed mode.

In the above explanation, the configuration in which eight pins from 10th to 17th are provided for high-speed mode is taken as an example; however, as shown in FIG. 9, it is possible to prepare for a future expansion of functions by adding one more pin.

In this manner, according to the present embodiment, in the SD memory card 100, the pins for normal mode that are assigned the functions same as the normal SD memory card are provided in the same arrangement as the normal SD memory card, so that compatibility with the host device compatible with only the normal SD memory card can be maintained. Moreover, high-speed data transfer by the differential signal can be performed by using the pins for high-speed mode. Furthermore, some of the existing pins for normal mode are used as a differential clock pin pair by changing to a different function in the high-speed mode, so that a new pin does not need to be provided for differential clock transfer, whereby constraints on the wiring layout of the circuit substrate 7 can be made small compared with the case of newly providing all of the pins for high-speed mode. Therefore, the data high-speed transfer is possible while maintaining compatibility with the normal host device, and constraints on the wiring layout of the circuit substrate 7 on which a semiconductor memory is mounted are small.

Second Embodiment

Figure 10A:
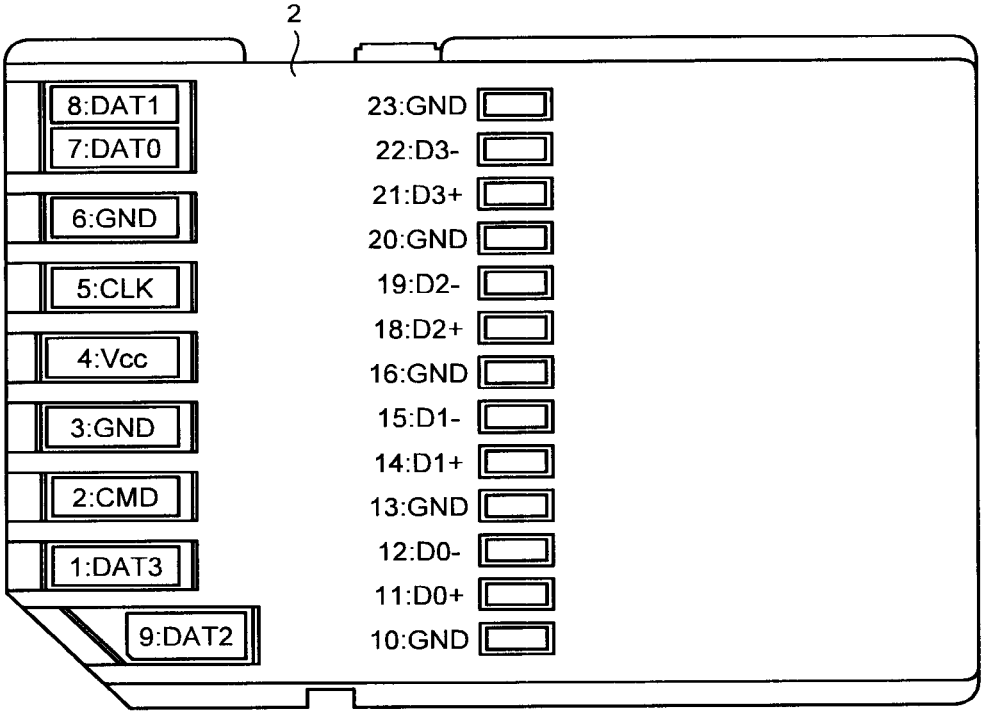
FIG. 10A and FIG. 10B are diagrams illustrating an appearance of the SD memory card as a semiconductor memory card according to a second embodiment.

FIG. 10A is a diagram illustrating the appearance of the SD memory card as a semiconductor memory card according to the second embodiment. FIG. 10A illustrates the appearance of the SD memory card 100 viewed from the lower case 2 side. The SD memory card 100 includes 1st to 9th pins for normal mode, and 10th to 16th and 18th to 23rd pins for high-speed mode.

The 10th to 16th and 18th to 23rd pins are pins used only in the high-speed mode, and the 10th to 16th pins are similar to the above first embodiment. The 18th pin is assigned D2+, the 19th pin is assigned D2−, the 20th pin is assigned GND, the 21st pin is assigned D3+, the 22nd pin is assigned D3−, and the 23rd pin is assigned GND. The 17th pin assigned Vcc2 is omitted. In the present embodiment, four pairs (pair of the 11th pin and the 12th pin, pair of the 14th pin and the 15th pin, pair of the 18th pin and the 19th pin, and pair of the 21st pin and the 22nd pin) of adjacent pins for differential signal are included, and each pin pair is arranged to be sandwiched by GNDs. The pairs of the pins for differential signal each have the data transfer function for one channel, so that the SD memory card 100 has the data transfer function totally for four channels. Therefore, the data transfer speed can be further increased compared with the first embodiment.

Figure 10B:
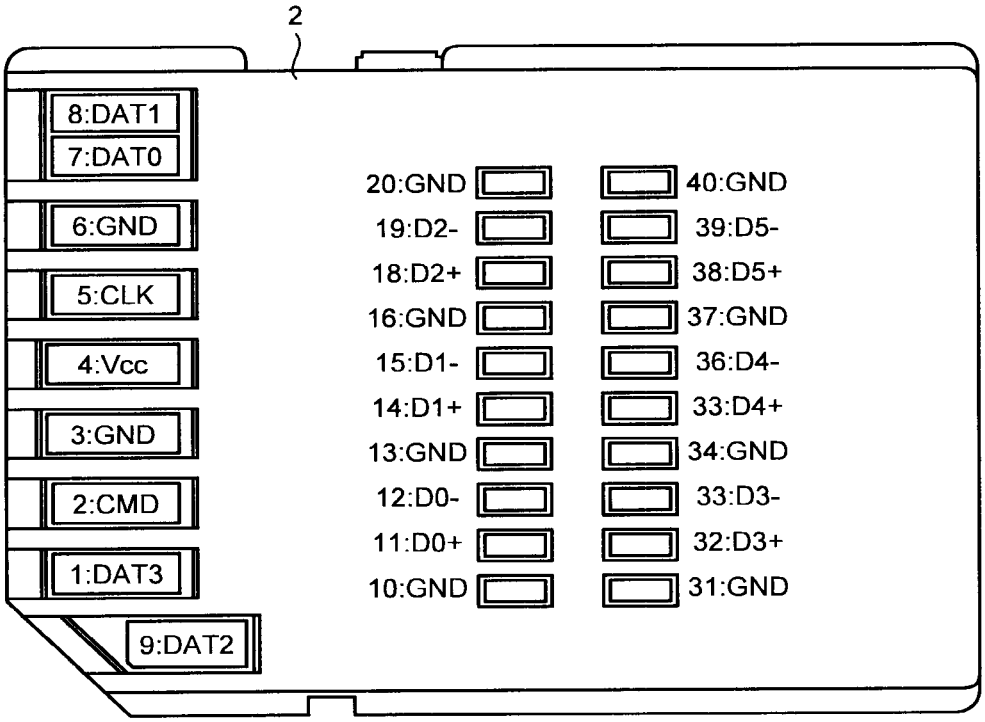

As shown in FIG. 10B, it is possible to further increase the number of the channels (six channels in FIG. 10B) by arranging the pins for high-speed mode in a plurality of rows. In such a configuration also, each pair of the pins for differential signal is arranged to be sandwiched by GNDs positioned on both sides.

In this manner, the data transfer speed can be further increased by further increasing the number of the pin pairs for differential signal for high-speed mode.

In this example, explanation is given for the configuration in which the 18th to 23rd pins are set for the differential signal as an example; however, it is needless to say that the pins can be used for other purposes.

Others are similar to the first embodiment, so that overlapping explanation is omitted.

Third Embodiment

Figure 11:
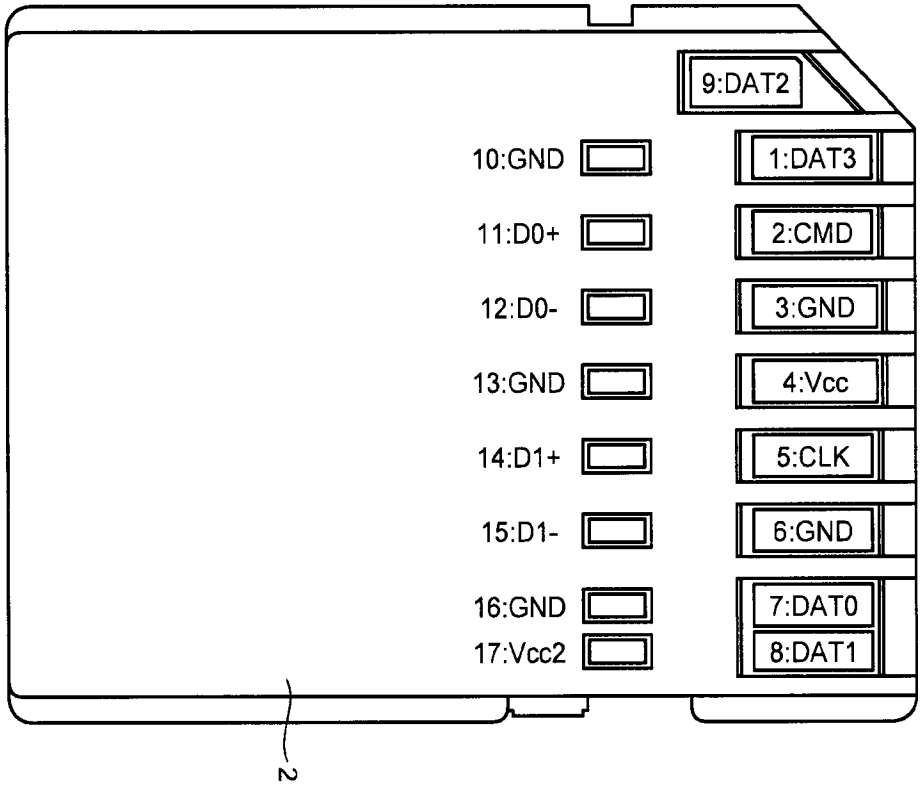
FIG. 11 is a diagram illustrating an appearance of the SD memory card as a semiconductor memory card according to a third embodiment.

FIG. 11 is a diagram illustrating the appearance of the SD memory card as a semiconductor memory card according to the third embodiment. FIG. 11 illustrates the appearance of the SD memory card 100 viewed from the lower case 2 side. The SD memory card 100 includes 1st to 9th pins for normal mode and 10th to 17th pins for high-speed mode. The function of each pin is similar to the first embodiment.

In the above first embodiment, the configuration is illustrated as an example, in which the pins for normal mode are separated from the pins for high-speed mode, and the memory controller 12 is arranged therebetween; however, the preset invention is not limited to such an arrangement, and the pins for normal mode and the pins for high-speed mode can be arranged close to each other so long as a desired data transfer speed can be realized.

Figure 12A:
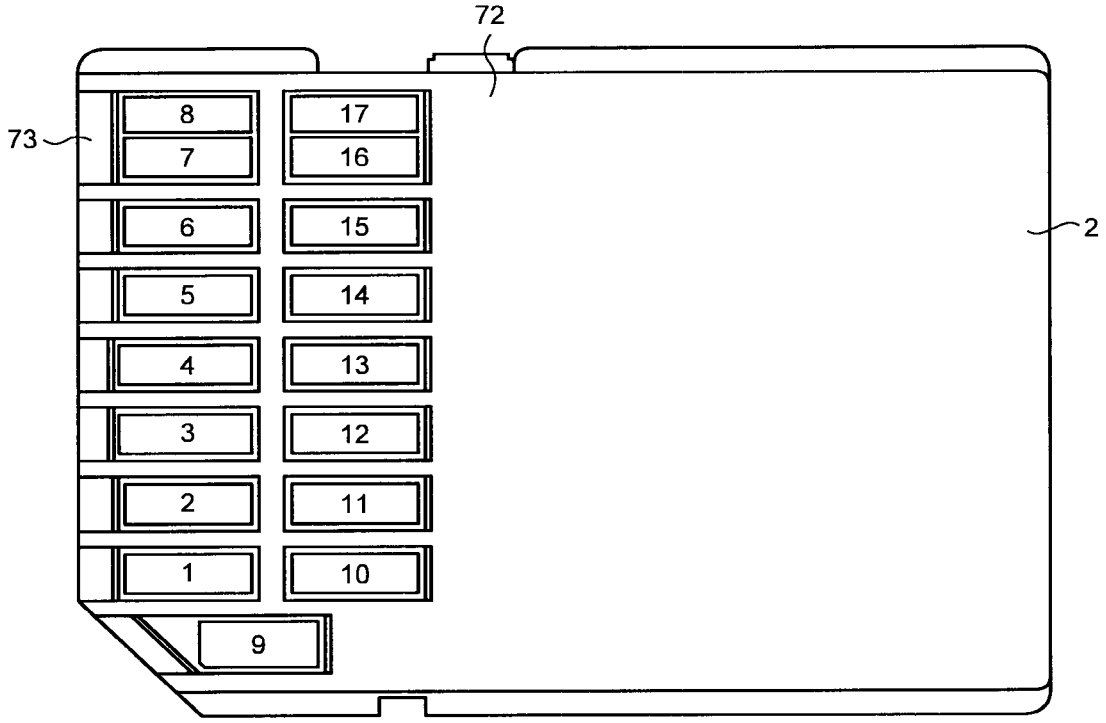
FIG. 12A, FIG. 12B, FIG. 12C, FIG. 12D, and FIG. 12E are diagrams illustrating an example of a shape of a thin portion provided in the lower case.
Figure 12B:
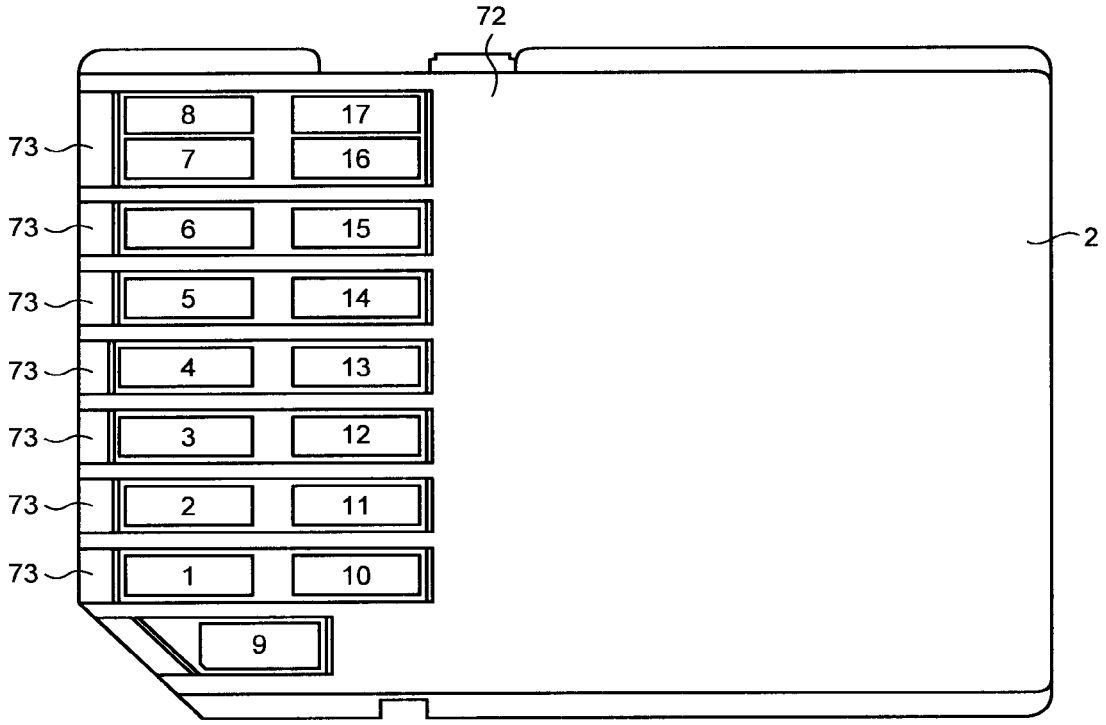
Figure 12C:
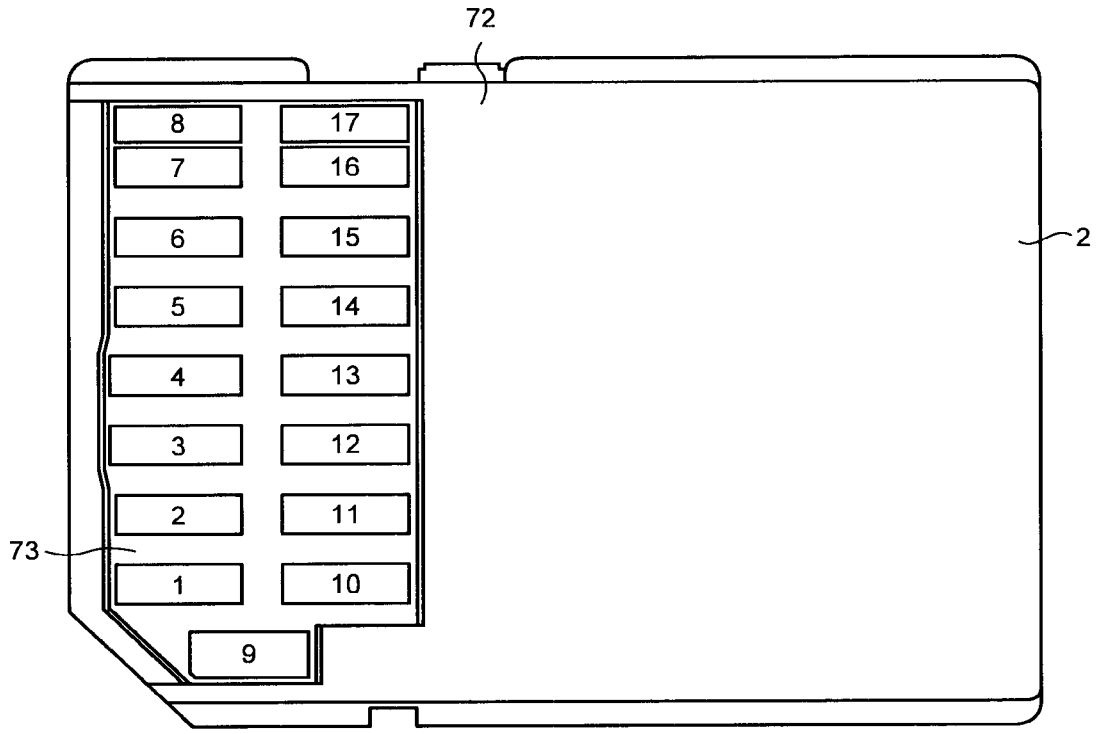

The pins for high-speed mode are exposed by providing a thin portion in the lower case 2 and forming openings therein in the similar manner to the pins for normal mode; however, when the configuration is such that the pins for high-speed mode are arranged near the pins for normal mode, as shown in FIG. 12A, it is applicable that a portion around each pin for high-speed mode becomes a normal thick portion 72. Moreover, in the case of providing the pins for high-speed mode on the backward side in the inserting direction into the host device to correspond to the pins for normal mode, as shown in FIG. 12B, it becomes easy to process a mold for molding the lower case 2 by extending groove-shaped thin portions 73 for the pins for normal mode and forming openings for exposing the pins for high-speed mode therein. Furthermore, as shown in FIG. 12C, it becomes easier to process a mold for molding the lower case 2 by forming the groove-shaped thin portion 73 to accommodate the pins for normal mode and the pins for high-speed mode. However, it is preferable from the viewpoint of preventing lowering of strength of the SD memory card 100 and incorrect contact with the pin on the connector side that the thin portion 73 be smaller as shown in FIG. 12A. However it is possible to determine the shape of the thin portion 73 considering stiffness, processability, and the like of the material of the lower case 2 comprehensively.

Others are similar to the above first embodiment, so that overlapping explanation is omitted.

Figure 13:
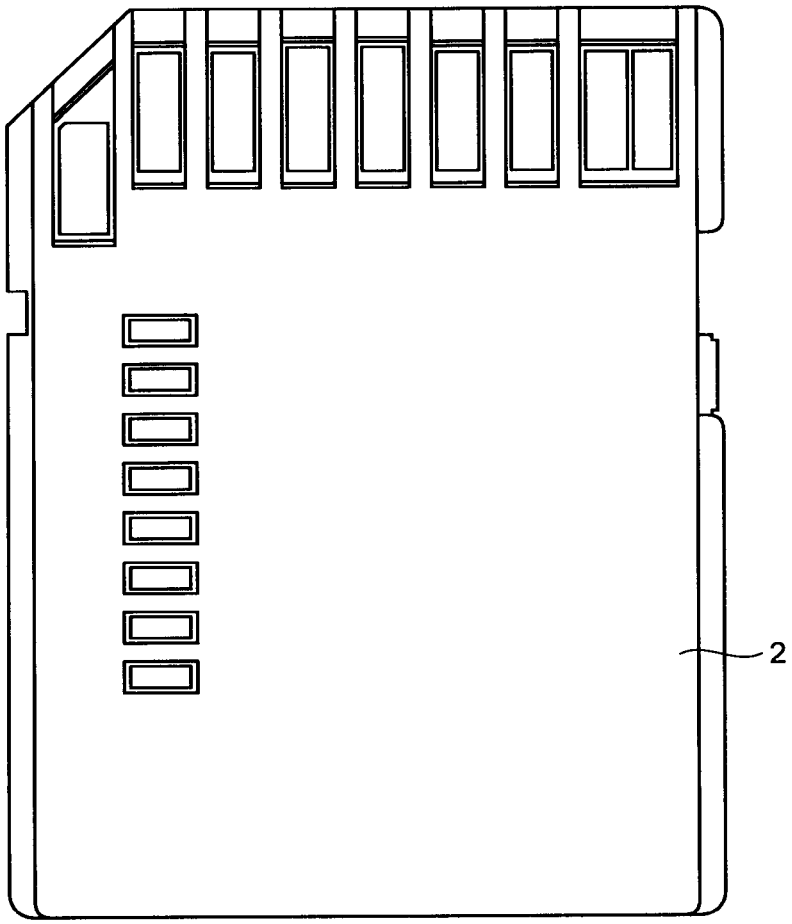
FIG. 13 is a diagram illustrating an example of the SD memory card in which the pins for high-speed mode are arranged in a direction different from the pins for normal mode.

In the above each embodiment, the configuration is taken as an example, in which the pins for high-speed mode are arranged in the same direction as the pins for normal mode; however, an arrangement direction of the pins for high-speed mode is not limited thereto in the present invention, and as shown in FIG. 13, the pins for high-speed mode can be arranged in a direction different from the pins for normal mode.

Figure 12D:
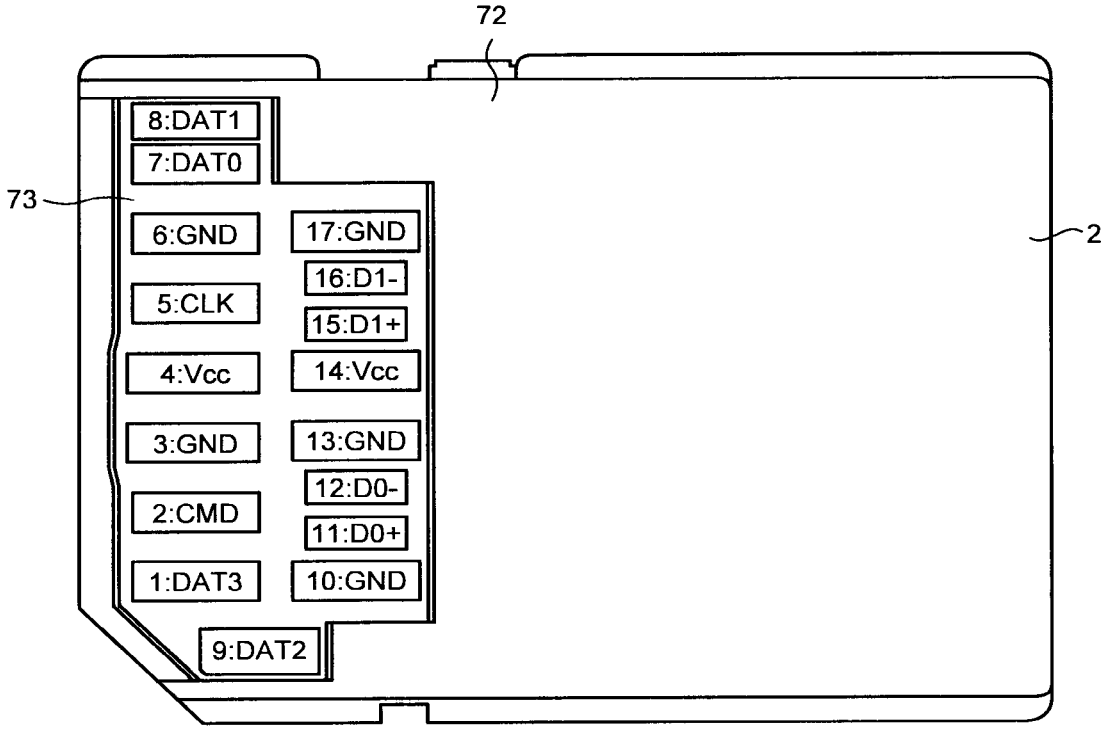

FIG. 12D is a modified example of FIG. 12C. As shown in FIG. 12D, the 10th pin, the 13th pin, and the 17th pin are assigned (GND), the 14th pin is assigned Vcc2 (power source), the 11th pin is assigned D0+ (differential data +), the 12th pin is assigned D0− (differential data −), the 15th pin is assigned D1+ (differential data +), and the 16th pin is assigned D1− (differential data −). The 1st to 9th pins are the same as the assignment shown in FIG. 11. In the pins for high-speed mode, the size of the GND and power source pins are made larger than the size of the differential data pins. Consequently, GND and power source can be provided reliably and a parasitic capacity of the differential data pin can be made small to enable high-speed operation. Moreover, the power source pin (4th pin) for normal mode and the power source pin (14th pin) for high-speed mode are arrange adjacent to each other, so that a potential difference between the 4th pin and the 14th pin can be made small. In other words, the pin arrangement is such that the distance between the power source pin and the GND pin is large. Consequently, leak current between the pins can be reduced.

Figure 12E:
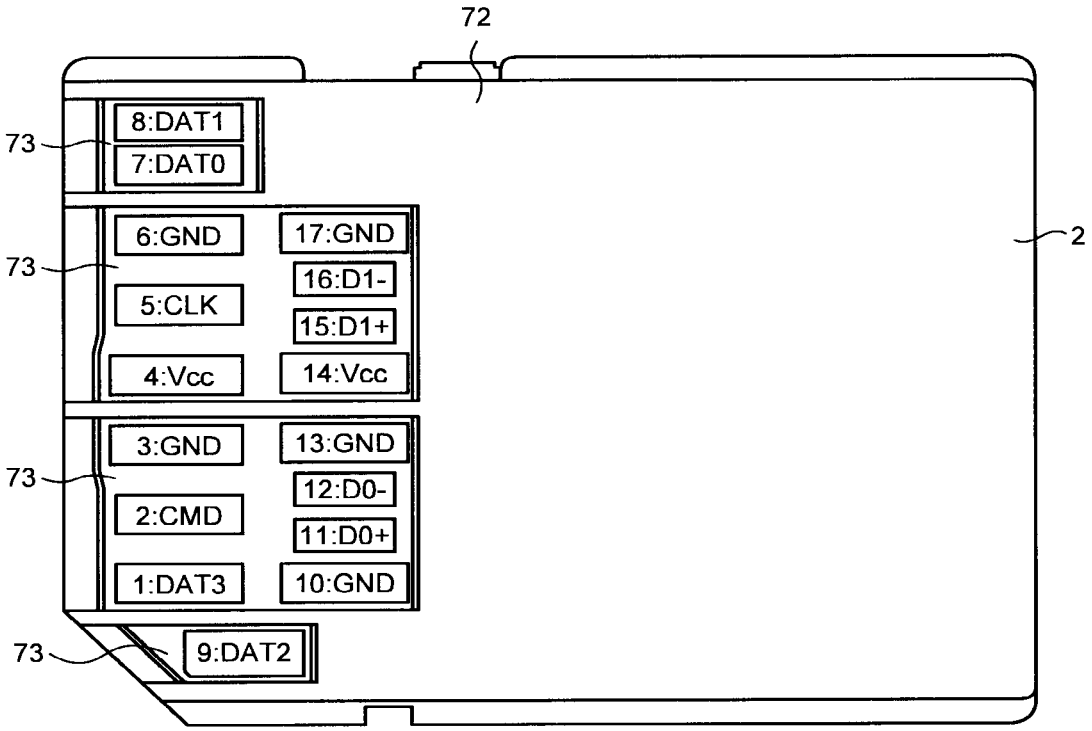

FIG. 12E is a modified example of the pins for high-speed mode shown in FIG. 12B. As shown in FIG. 12E, the differential data pins are made small compared with the GND or power source pin of the pins for high-speed mode, and therefore the pitch between the pins for normal mode becomes different from the pitch between the pins for high-speed mode. Thus, the thin portion 73 is provided in a region in which the pitch between the pins for normal mode and the pins for high-speed mode matches. In an example of FIG. 12E, the thin portion 73 is provided with the differential data pins, and the GND or power source pin sandwiching them of the pins for high-speed mode are contained in one region.

As explained above, according to the embodiments, it is possible to obtain an effect that a semiconductor memory card can be provided, which is capable of performing the data high-speed transfer while maintaining compatibility with the normal host device and in which constraints on the wiring layout of the circuit substrate on which the semiconductor memory is mounted are small.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A semiconductor memory card that includes a semiconductor memory that is mounted on one surface of a substrate and a controller that is mounted on the other surface of the substrate and controls the semiconductor memory, and is capable of operating in a first mode and a second mode in which data is transferred at a higher speed than the first mode, comprising:

a first pin group which includes a plurality of pins arranged in a line at an end portion on [a] *one* side of [an inserting direction into a connector] *the semiconductor memory card*, which functions as four data pins, one command pin, one power source pin, one clock pin, and two ground pins in the first mode, and part of which is used both in the first and second modes; and a second pin group which includes a plurality of pins including at least two pin pairs for differential signal, is arranged *in a line at a portion between a center of the semiconductor memory card and the other side of the semiconductor memory card* so that a ground is positioned on both sides of each of the pin pairs for differential signal, and is used only in the second mode, wherein in the second mode, among the respective pins configuring the first pin group, [any of] adjacent two [out of ones that function as the data pins, the command pin, and the clock pin in the first mode] *pins* are [changed] *assigned* to *different function from that of the first mode as* a pin pair for differential clock signal to function as the pin pair for differential clock signal, and a function of remaining pins of the first pin group is [stopped] *invalidated*.

2. The semiconductor memory card according to claim 1, wherein

*the first pin group is arranged in a first direction, and* the second pin group is arranged in [approximately same] *the first* direction [as the first pin group] at a position that is near a center [in] *of* the [inserting direction and near an end on an opposite side of the inserting direction] *semiconductor memory card.*

3. The semiconductor memory card according to claim 2, wherein the second pin group is arranged to be divided into a plurality of rows in the [inserting] *first* direction.

4. The semiconductor memory card according to claim 1, wherein the first pin group and the second pin group are arranged to sandwich a region on the substrate in which the controller is mounted.

5. The semiconductor memory card according to claim 1, wherein each of the pins forming the second pin group is arranged without being offset in a *second* direction perpendicular to the [inserting] *first* direction with respect to the pins forming the first pin group.

[6. The semiconductor memory card according to claim 1, wherein the second pin group is arranged in a direction different from the first pin group.]

[7. The semiconductor memory card according to claim 1, wherein the second pin group is arranged in approximately same direction as the first pin group adjacently to the first pin group.]

[8. The semiconductor memory card according to claim 7, further comprising an upper case and a lower case that accommodates the substrate, wherein the lower case includes a thin portion in a region facing a region in which the first and second pin groups are formed, and the first and second pin groups are exposed outside the upper case and the lower case via an opening provided in the thin portion.]

[9. The semiconductor memory card according to claim 8, wherein there is provided one said thin portion commonly to all of the pins of the first and second pin groups.]

[10. The semiconductor memory card according to claim 8, wherein each of the pins forming the second pin group is arranged adjacently in the inserting direction with respect to the pins forming the first pin group, and the thin portion is formed commonly to a plurality of pins adjacent in the inserting direction.]

11. The semiconductor memory card according to claim 1, wherein an area of each of the pins forming the second pin group is smaller than an area of each of the pins forming the first pin group.

12. The semiconductor memory card according to claim 1, wherein wires that connect respective pins for differential signal of the second pin group and the controller are formed on the substrate to have approximately equal length.

13. The semiconductor memory card according to claim 1, wherein wires that connect respective pins for differential signal of the second pin group and the controller are formed approximately in parallel on the substrate for each of the pin pairs.

14. The semiconductor memory card according to claim 1, wherein wires that connect respective pins for differential signal of the second pin group and the controller have approximately equal length and are formed approximately in parallel on the substrate for each of the pin pairs.

15. The semiconductor memory card according to claim 1, wherein each wire that connects each of the four data pins of the first pin group and the controller, a wire that connects the clock pin and the controller, and a wire that connects the command pin and the controller are formed on the substrate to have approximately equal length.

16. The semiconductor memory card according to claim 1, further comprising a case that accommodates the substrate, wherein an outer shape of a side surface of the case is different from a case of a semiconductor memory card exclusively for the first mode at least at one part.

17. The semiconductor memory card according to claim 16, wherein the case includes a notch for distinguishing from the case of the semiconductor memory card exclusively for the first mode.

18. The semiconductor memory card according to claim 1, wherein at least one of a pin in the first pin group has a larger area than a pin of same function of the semiconductor memory card exclusively for the first mode.

19. The semiconductor memory card according to claim 1, wherein the semiconductor memory is a NAND-type flash memory.

*20. A memory card comprising:*

*a substrate having a front edge, a back edge, the front edge being an edge arranged on a side of an inserting direction into a connector, the back edge being an edge arranged on an opposite side of the front edge;*

*a memory mounted on the substrate, the memory including NAND memory which is capable of storing data;*

*a controller mounted on the substrate, the controller controlling the NAND memory in the memory with a first mode operation and a second mode operation, the second mode operation being able to transfer data at a higher speed than the first mode operation, the controller having a first terminals and a second terminals;*

*a first pin group which includes a plurality of first pins arranged near the front edge of the substrate and which is coupled to the first terminals of the controller, the plurality of first pins functioning as four data pins, one command pin, one power source pin, one clock pin, and two ground pins in the first mode operation, part of the plurality of first pins being used both in the first operation and second mode operation;*

*a second pin group which includes a plurality of second pins positioned to be apart from the first pin group in the inserting direction and which is coupled to the second terminals of the controller, the plurality of second pins functioning as a first pin pair for a first differential data signal, a second pin pair for a second differential data signal, one source pin and at least two ground pins, the first pin pair and the second pin pair being positioned between the two ground pins, the plurality of second pins being used in the second mode operation;*

*an exterior case housing the substrate, the exterior case covering the memory and the controller, the exterior case exposing the plurality of first pins and the plurality of second pins;*

*a first resistive element positioned between the part of the plurality of first pins of the first pin group and the first terminals of the controller; and*

*a second resistive element positioned between part of the plurality of second pins of the second pin group and the second terminals of the controller.*

*21. The memory card according to claim 20, wherein*

*in the second mode, among the first pins, adjacent two pins are assigned to different function from that of the first mode as a pin pairs for differential clock signal and to invalidate remaining pins of the first pins.*

*22. The memory card according to claim 20, wherein the second pin group is arranged at a position that is offset from a central portion in the inserting direction.*

*23. The memory card according to claim 20, wherein the second pin group is arranged to be divided into a plurality of rows.*

*24. The memory card according to claim 20, wherein the first resistive element and the second resistive element are arranged on a side of the memory card to avoid a central portion thereof.*

*25. The memory card according to claim 20, wherein each of the second pins is arranged so as not to offset in a direction perpendicular to the inserting direction with respect to the first pins in a staggered manner.*

*26. The memory card according to claim 20, wherein the first resistive element and the second resistive element respectively include a plurality of resistors.*

*27. The memory card according to claim 20, wherein an area of the second pins arranged is smaller than an area of the first pins arranged.*

*28. The memory card according to claim 20, wherein the second terminals respectively coupled to the first pin pair and the second pin pair via the second wires, each of the second wires has approximately equal length.*

*29. The memory card according to claim 20, wherein the second terminals respectively coupled to the second pin pair and the second pin pair via the second wires, each of the second wires are arranged approximately in parallel on the substrate for each of the pin pairs.*

*30. The memory card according to claim 20, wherein the controller is mounted between the front edge and a central portion of the substrate in the inserting direction.*

*31. The memory card according to claim 20, wherein the first terminals respectively coupled to the first pins via first wires, each of the first wires has approximately equal length.*

*32. The memory card according to claim 20, wherein, when seen through from a direction perpendicular to the first surface of the substrate, a side edge of the exterior case has an outer shape that indicates the exterior case is compatible with the second mode operation.*

*33. The semiconductor memory card according to claim 32, wherein the exterior case has a notch as the outer shape.*

*34. The memory card according to claim 20, wherein at least one of first pins has an expanded portion that indicates the exterior case is compatible with the second mode operation.*

*35. The memory card according to claim 20, wherein the memory has a first memory and a second memory, each includes a NAND-type flash memory.*

*36. The memory card according to claim 20, wherein date transfer speed of the first mode is 20 Mbyte/sec, and date transfer speed of the second mode is 300 Mbyte/sec.*

*37. The memory card according to claim 20, wherein the plurality of second pins are arranged along the inserting direction.*

* * * * *